United States Patent [19]
Ariyan et al.

[11] 3,852,293
[45] Dec. 3, 1974

[54] 4-PHENYL-2-(3-PYRIDYL)-THIAZOLE CARBOXAMIDES

[75] Inventors: Zaven S. Ariyan, Woodbury, Conn.; William A. Harrison, Guelph, Ontario, Canada

[73] Assignees: Uniroyal, Inc., New York, N.Y.; Uniroyal Ltd., Montreal, Quebec, Canada

[22] Filed: June 21, 1972

[21] Appl. No.: 264,817

[52] U.S. Cl. 260/294.8 D, 260/247.1, 260/294.8 E, 424/248, 424/263
[51] Int. Cl............................................ C07d 31/50
[58] Field of Search............................. 260/294.8 D

[56] References Cited
UNITED STATES PATENTS
3,705,153   12/1972   Kaneko et al................ 260/294.8 D OTHER PUBLICATIONS
Burger, Medicinal Chemistry, Third Edition, Part Two, Pages 956–958, Wiley Interscience Publishers, RS403B8 C.2 1970.

*Primary Examiner*—Alan L. Rotman
*Attorney, Agent, or Firm*—Bruce F. Jacobs, Esq.

[57]   ABSTRACT

A broad class of thiazole derivatives, including certain novel 2-(3-pyridyl)thiazoles, are useful as anti-inflammatory agents.

4 Claims, No Drawings

4-PHENYL-2-(3-PYRIDYL)-THIAZOLE CARBOXAMIDES

CROSS REFERENCE TO RELATED APPLICATIONS

This application is related to, and incorporates by reference, the application of Harrison et al., Ser. No. 140,571, filed on May 5, 1971, which discloses methods for preparing many of the thiazole derivatives of the present invention.

BACKGROUND OF THE INVENTION

1. Field of the Invention

The invention relates to thiazole derivatives, some of which are novel compounds, which are useful as anti-inflammatory agents, i.e., they prevent and/or inhibit the formation of granuloma tissue in animals. Accordingly, the invention is, in one aspect thereof, a method of preventing and/or inhibiting the formation of granuloma tissue in animal subjects. In a second aspect, the invention is a class of pharmaceutical compositions containing the present thiazole derivatives. In a third aspect, the invention is a class of novel compounds.

2. Description of the Prior Art

Thiazole derivatives, including numerous pyridyl-thiazoles are known.

The French patent application FM0008423, for example, discloses certain thiazole derivatives as having anti-inflammatory activity. These compounds are structurally dissimilar to the compounds of the present invention in that they are all substituted in the pyridyl ring by a group such as =O, =S, —OR or —SR. The compounds of the present invention, on the other hand, do not contain any such groups in the pyridyl rings thereof.

Dutch patent application 70/07029 discloses a group of 2-(3-pyridyl)thiazoleacetic acid derivatives as having anti-inflammatory activity.

The application of Harrison et al., noted above, discloses a broad class of 2-(3-pyridyl)thiazoles and methods for preparing same.

According to the application of Harrison et al., 2-(3-pyridyl)thiazoles are prepared by well known methods of thiazole synthesis. Thus, as described in Harrison et al., a thioamide of the formula:

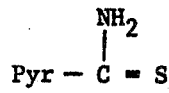

is reacted with an α-halocarbonyl compound of the formula:

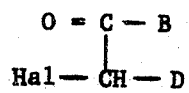

in the presence of a solvent such as alcohol with heating, followed by basification to form a compound of the formula:

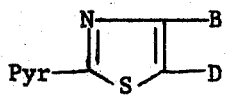

wherein Pyr is a pyridyl or an alkyl-substituted pyridyl group, B is an alkyl group, a carboxylate group or a carbamoyl group, D is, e.g., a carboxylate, carbamoyl or a mono- or di-substituted carbamoyl group and Hal is a halogen.

SUMMARY OF THE INVENTION

The invention provides a safe and effective method of preventing and inhibiting the formation of granuloma tissue in an animal subject. This is achieved by administering to an animal subject a therapeutically effective amount of at least one compound selected from a very large group of 2-(3-pyridyl)thiazoles, some of which are known and some of which are novel. Generally, the amount administered will be from about 0.1 to 100 mg/kg/day of body weight, preferably from about 10 to 50 mg/kg/day. In humans, the amount will be from about 0.1 to 2 mg/kg/day, preferably from about 0.25 to 1.0 mg/kg/day.

The invention further provides a new class of 2-(3-pyridyl)thiazoles with are effective as anti-inflammatory agents, as well as pharmaceutical compositions comprising both the known and novel thiazole derivatives.

The 2-(3-pyridyl)thiazoles which are among those used in the present methods are those having the formulae:

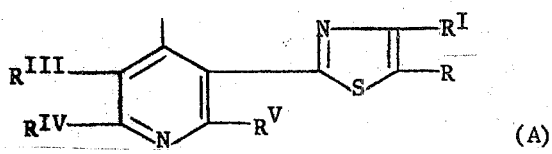

(A)

wherein R is
a. hydrogen;
b. COOR$_1$, wherein R$_1$ is an alkyl group of up to six carbon atoms, propynyl, cyclohexyl or methoxyethyl;
c. CONR$_2$R$_3$, wherein R$_2$ is hydrogen and R$_3$ is hydrogen, an alkyl group of up to four carbon atoms, tolyl, pyridyl, or cyclohexyl; or wherein R$_2$ and R$_3$ are independently selected from the group consisting of alkyl groups of up to three carbon atoms and phenyl; or wherein R$_2$ and R$_3$ together with the nitrogen atom to which they are bound, form a pyrrolidino or 2,6-dimethylmorpholino group; or
d.

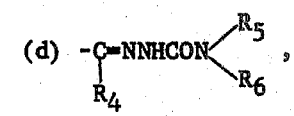

wherein R$_4$, R$_5$ and R$_6$ are hydrogen or lower alkyl groups;
R$^I$ is a lower alkyl group, —COOC$_2$H$_5$; —CONHCH$_3$ or CONH(o-tolyl);
and
R$^{II}$, R$^{III}$, R$^{IV}$ and R$^V$ are each hydrogen or a lower alkyl group; and pharmaceutically acceptable acid addition salts thereof; and

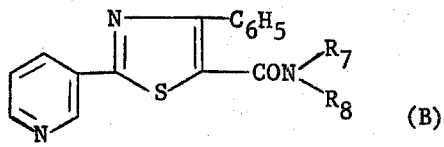

(B)

wherein $R_7$ is hydrogen or an alkyl group of up to three carbon atoms and $R_8$ is an alkyl group of up to three carbon atoms; and pharmaceutically acceptable acid addition salts thereof.

The pharmaceutical compositions according to the invention comprise, in combination, a therapeutically effective amount of at least one of the above-described thiazole derivatives and a pharmaceutically acceptable carrier and/or diluent therefor.

For example, in the case of a tablet, the composition will comprise, in addition to the active ingredient, fillers, binders and diluents such as lactose, methylcellulose, talc, gum tragacanth, gum acacia, agar, polyvinylpyrrolidone, stearic acid, and/or corn starch, etc. In the case of a liquid suspension for oral administration, the composition will comprise, in addition to the active ingredient, a filler such as sodium carboxymethylcellulose and/or syrup, e.g., a glycerine-based syrup. In the case of a parenteral solution or suspension, the composition will comprise, in addition to the active ingredient, a suitable solvent or other liquid such as a saline solution. In the case of a topical ointment, the composition will comprise, in addition to the active ingredient, a vehicle such as petroleum jelly or hydrophilic petrolatum.

The most preferred compound from among those of the formula (A) is N,N,4-trimethyl-2-(3-pyridyl)-5-thiazolecarboxamide, i.e., the compound wherein R is —CON(CH$_3$)$_2$, $R^I$ is methyl, and $R^{II}$ through $R^V$ are hydrogen. This compound in the rat (at a dose of 200 mg/kg) produces a reduction of 41% in carrageenin-induced edema.

Another preferred compound is 4-ethyl-2-(3-pyridyl)-thiazole, i.e., the compound wherein R is hydrogen, $R^I$ is ethyl and $R^{II}$ through $R^V$ are hydrogen. This compound in the rat (at a dose of 200 mg/kg) produces a reduction of 33% in carrageenin-induced edema.

The most preferred compound from among those of the formula (B) is N-isopropyl-4-phenyl-2-(3-pyridyl)-5-thiazolecarboxamide, i.e., the compound wherein $R_7$ is hydrogen and $R_8$ is —CH(CH$_3$)$_2$. This compound in the rat (at a dose of 200 mg/Kg) produces a reduction of 42% in carrageenin-induced edema. The preferred compounds also include their pharmaceutically acceptable acid addition salts.

The novel compounds of the invention are those of the formula (A) wherein R is —C(CH$_3$)=NNHCONH$_2$, $R^I$ is —CH$_3$ and $R^{II}$ through $R^V$ are hydrogen; and those of the formula (B) wherein $R_7$ and $R_8$ are both methyl or ethyl, or $R_7$ is hydrogen and $R_8$ is methyl or isopropyl; and the hydrochlorides thereof.

DETAILED DESCRIPTION

The 2-(3-pyridyl)thiazoles of the present invention can be prepared by the methods disclosed in the application of Harrison et al.

A method for preparing the compound of the formula (A) is the reaction sequence which comprises reacting an α-halocarbonyl compound of the formula:

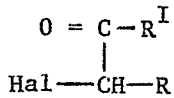

and a thioamide of the formula:

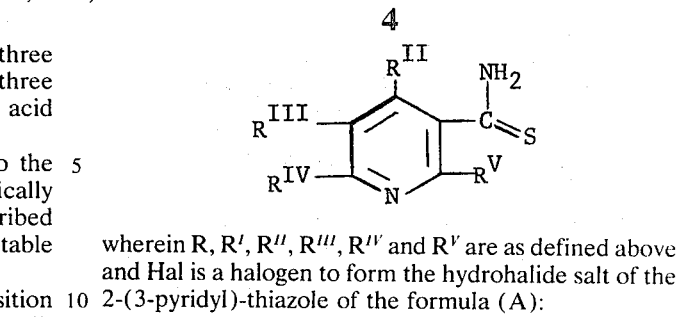

wherein R, $R^I$, $R^{II}$, $R^{III}$, $R^{IV}$ and $R^V$ are as defined above and Hal is a halogen to form the hydrohalide salt of the 2-(3-pyridyl)-thiazole of the formula (A):

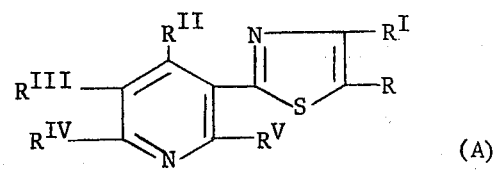

(A)

The free base is obtained from the hydrohalide salt by basification with an alkali such as ammonium hydroxide, an alkali metal hydroxide, sodium bicarbonate, etc. Alternatively, one may use excess thioamide in the reaction to neutralize the hydrogen chloride produced. Under these conditions the reaction yields the free base directly and the unreacted thioamide can be recovered from its hydrohalide salt by treatment with a base such as ammonium hydroxide, an alkali metal hydroxide or sodium bicarbonate.

A method for preparing the compounds of the formula (B) is the reaction sequence which comprises reacting an α-halocarbonyl compound of the formula:

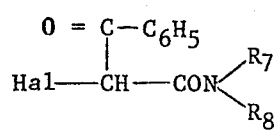

and thionicotinamide wherein $R_7$ and $R_8$ are as defined above and Hal is a halogen to form the hydrohalide salt of the 2-(3-pyridyl)-thiazole of the formula (B):

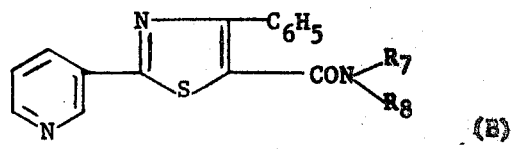

(B)

The free base is obtained in the same manner as described above.

The actual preparation of the 2-(3-pyridyl)thiazole derivatives consists of mixing the α-halocarbonyl compound with the thioamide (excess thioamide may be used) in the presence of a suitable polar solvent such as dimethylformamide or a lower alkanol and heating the mixture to about 60° to 100°C for 2 to 10 hours, followed by basification. The 2-(3-pyridyl)thiazole formed in the reaction is then isolated using conventional techniques.

When the required α-halocarbonyl compound is not readily available, it may be convenient to prepare another pyridylthiazole derivative and convert it to the desired product. For example, ethyl α-chlorobenzoylacetate and thionicotinamide can be reacted to yield ethyl-4-phenyl-2-(3-pyridyl)-5-thiazolecarboxylate, which can be used as an intermediate for preparation of compounds such as N-isopropyl-4-phenyl-2-(3-pyridyl)-5-thiazolecarboxamide.

Another example is the semicarbazone of methyl-4-methyl-2-(3-pyridyl)-5-thiazolyl ketone (formula (A) wherein R is —C(CH$_3$)=NNHCONH$_2$, R$^I$ is CH$_3$ and R$^{II}$, R$^{III}$, R$^{IV}$ and R$^V$ are each H). The ketone can be prepared from thionicotinamide and 3-chloro-2,4-pentanedione by the methods described above. Reaction of the ketone with semicarbazide hydrochloride in the presence of sodium acetate (a well known method of making semicarbazones) yields the desired product.

As previously stated, the application of Harrison et al. discloses and exemplifies the preparation of many of the compounds of the present invention using the above-described methods. For the sake of convenience and completeness, however, there follow working examples showing the preparation of some of the present compounds usisng the same methods. It will be understood, of course, that the methods are also applicable to all the compounds of the present invention.

EXAMPLE 1

Preparation of N,N,4-trimethyl-2-(3-pyridyl)-5-thiazolecarboxamide

Thionicotinamide (55.2 g., 0.40 mole), 2-chloro-N,N-dimethylacetoacetamide (32.7 g., 0.20 mole) and methanol (200 ml.) were heated under reflux with stirring for four hours. The solvent was evaporated under reduced pressure, toluene (300 ml.) added to the residue and the insoluble solids (mostly thionicotinamide hydrochloride) removed by filtration. The filtrate was washed three times with cold 15% sodium hydroxide solution (50, 25 and 25 ml. portions) and extracted twice with dilute hydrochloric acid (a total of 125 ml., prepared by dilution of 30 ml. of 37% acid). The acid extracts were made basic with aqueous ammonia and extracted three times with chloroform (100, 50 and 50 ml. portions). The chloroform extracts were dried with anhydrous sodium sulfate, filtered and evaporated. The residual pale yellow liquid solidified when cooled and scratched with a glass rod. After it was dried to constant weight under vacuum, the solid, N,N,4-trimethyl-2-(3-pyridyl)-5-thiazolecarboxamide, weighed 36.4 g. (73% yield based on 2-chloro-N,N-dimethylacetoacetamide) and melted at 63–66°C. On storage the product slowly changed to another crystal form which melted at 90–93°C. Recrystallization from toluene-ligroin or ethyl acetate-hexane gave crystals melting at 67–68°C or 93–95°C, depending on which crystal form was used to seed the solution.

EXAMPLES 2–26

These examples are directed to other 2-(3-pyridyl)thiazoles prepared. The preparation of compound 1 is shown in detail in Example 1 which is representative of methods employed for preparing the compounds of the formula (A) set forth in the following Table I, (or for preparing intermediates from which those compounds were made as described in the footnote to Table I):

TABLE I
2-(3-PYRIDYL)THIAZOLES

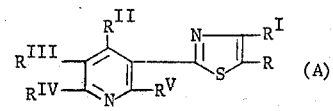

| Example | Cpd | R | R$^I$ | Yield Percent* | M.P. °C. | Salt |
|---------|-----|---|-------|----------------|----------|------|
| 1 | 1 | -CON(CH$_3$)$_2$ | -CH$_3$ | 73 | 67-68, 93-95 | |
| 2 | 2 | -CONH$_2$ | -CH$_3$ | 77 (54) | 204-207 | HCl 241-2d |
| 3 | 3 | -H | -C$_2$H$_5$ | 37 | 33-35 | HCl 166-8 |
| 4 | 4 | -C(CH$_3$)=NNHCONH$_2$ | -CH$_3$ | 60 | 222-224 | |
| 5 | 5 | -CON(C$_2$H$_5$)$_2$ | -CH$_3$ | 89 (62) | 39-41 | H$_2$SO$_4$ 148-50 |
| 6 | 6 | -COOCH$_2$C≡CH | -CH$_3$ | 29 (20) | 124-125 | |
| 7 | 7 | -CONHC$_6$H$_4$(o-CH$_3$) | -CONHC$_6$H$_4$(o-CH$_3$) | - | 183-187 | |
| 8 | 8 | -COO-⟨S⟩ | -CH$_3$ | 15 | 63-64 | |
| 9 | 9 | -COOCH$_2$CH$_2$OCH$_3$ | -CH$_3$ | 70 | 76-78 | |
| 10 | 10 | -COOC$_2$H$_5$ | -COOC$_2$H$_5$ | 11 | 69-71 | |
| 11 | 11 | -COOC$_2$H$_5$ | -CH$_3$ | 66 | 77-79 | |
| 12 | 12 | -CON(CH(CH$_3$)$_2$)$_2$ | -CH$_3$ | 61 (43) | 69-70 | |
| 13 | 13 | -CONH(CH$_2$)$_2$CH$_3$ | -CH$_3$ | 52 (36) | 109-110 | |
| 14 | 14 | -CONHCH(CH$_3$)(C$_2$H$_5$) | -CH$_3$ | 66 (46) | 144-145 | |
| 15 | 15 | -CONHCH$_2$CH(CH$_3$)$_2$ | -CH$_3$ | 62 (43) | 111-112 | |

TABLE I Cont.

| Example | Cpd | R | $R^I$ | Yield Percent* | M.P. °C. | M.P. °C. (Salt) |
|---|---|---|---|---|---|---|
| 16 | 16 | $-COOCH(CH_3)CH_2-CH(CH_3)_2$ | $-CH_3$ | 24 | Oil | |
| 17 | 17 | $-CON\diagup^{CH_3}_{C_6H_5}$ | $-CH_3$ | 42 (29) | 135-136 | |
| 18 | 18 | $-CON\diagup^{CH_3}_{CH_3}$ (cyclic) | $-CH_3$ | 55 (39) | Oil | |
| 19 | 19 | $-CON\diagup^{C_2H_5}_{C_6H_5}$ | $-CH_3$ | 31 (22) | 85-86 | |
| 20 | 20 | -CONH-(2-pyridyl) | $-CH_3$ | 29 (20) | 198-199 | |
| 21 | 21 | -CONH-(3-pyridyl) | $-CH_3$ | 77 (54) | 157-158 | |
| 22 | 22 | $-COOCH(CH_3)_2$ | $-CH_3$ | 19 | 89-92 | HCl 205-7d |
| 23 | 23 | -H | $-CONHCH_3$ | 65 (46) | 113-115 | $H_2SO_4$ 181-3 |
| 24 | 24 | -CON(pyrrolidinyl) | $-CH_3$ | 66 (46) | 75-77 | |
| 25 | 25 | -CONH-(S) (thienyl) | $-CH_3$ | 69 (48) | 63-64 | |
| 26 | 26 | $-CON(CH_3)_2$ | $-C_3H_7$ | 94 (61) | Oil | |

$R^{II}$, $R^{III}$, $R^{IV}$ and $R^V$ are all hydrogen except in compound 11 wherein $R^{III}$ is $-CH_3$

*The yields given for compounds 1, 3, 8, 9, 10, 11, 16 and 22 are for their direct synthesis from the appropriate thioamide and α-halocarbonyl compound as described in detail in Example 1. Compound 4 was made by reacting methyl 4-methyl-2-(3-pyridyl)-5-thiazolyl ketone with semicarbazide hydrochloride and sodium acetate in ethanol. The ketone was made by reacting thionicotinamide with 3-chloro-2,4-pentanedione by the method represented by Example 1. The overall yield is given. The other compounds were made indirectly from thiazolecarboxylic acids as described in detail in Example 27. The first figure is the yield based on the intermediate acid and the figure in parentheses is the overall yield based on the thioamide and original α-halocarbonyl compound.

The following Example describes a multi-step synthesis of a 2-(3-pyridyl)thiazole of the formula (B).

EXAMPLE 27

Preparation of N,N-dimethyl-4-phenyl-2-(3-pyridyl)-5-thiazolecarboxamide

Thionicotinamide (69 g., 0.50 mole), ethyl α-chlorobenzoylacetate (114 g., 0.50 mole) and absolute ethanol (600 ml.) were heated under reflux for 6 hours. Three hours after the reaction was started, dropwise addition of triethylamine (50.5 g., 0.50 mole) was begun. Half of the amine was added during the fourth hour of heating and the rest during the fifth and sixth hours. The reaction mixture was cooled and the solid product filtered off, washed with water and dried. The product, ethyl 4-phenyl-2-(3-pyridyl)-5-thiazolecarboxylate, weighed 113.5 g. (73% yield) and melted at 141–144°C.

The ethyl ester (93 g., 0.30 mole) was hydrolyzed to 4-phenyl-2-(3-pyridyl)-5-thiazolecarboxylic acid by heating on a steam bath for about 30 minutes with a solution of sodium hydroxide (15 g.) in water (300 ml.) and ethanol (150 ml.). Dilution with water (600 ml.) and neutralization with hydrochloric acid, followed by acidification with acetic acid, precipitated the product which was filtered off and dried. Yield of the acid: 84 g. (99%), m.p. 230–232°C (decomp.).

A slurry of the acid (56.4 g., 0.20 mole) in toluene (500 ml.) was treated with thionyl chloride (42 g., 0.35 mole) and heated with stirring at 60–70°C for 4 hours. The reaction mixture was cooled and the solid, crude 4-phenyl-2-(3-pyridyl)-5-thiazolecarbonyl chloride hydrochloride, collected by filtration and washed with toluene. The solid was then added in portions to a cold, stirred mixture of toluene (500 ml.) and 40% aqueous dimethylamine (100 ml.). The reaction mixture was stirred at room temperature for about 2 hours, the layers were separated, and the toluene layer washed with water and extracted with dilute hydrochloric acid (50 ml. of 37% acid diluted to 250 ml.). When the acid extract was made basic with aqueous ammonia, an oil precipitated which subsequently solidified. The dried product, N,N-dimethyl-4-phenyl-2-(3-pyridyl)-5-thiazolecarboxamide, weighed 58 g. (94% yield from the acid of 68% overall) and melted at 119– 122°C. After recrystallization from ethyl acetate the product melted at 121–123°C.

Treatment of a cold acetone solution of the product with a slight excess of 37% hydrochloric acid gave a precipitate of the hydrochloride, m.p. 212–217°C (dependent on rate of heating).

The following Examples 27–31, as set forth in Table II are directed to the preparation of other 2-(3-pyridyl)thiazoles of the formula (B).

TABLE II

2-(3-PYRIDYL)THIAZOLES

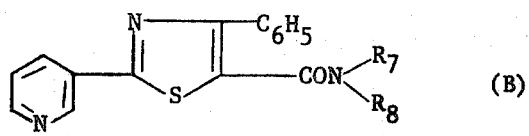

(B)

| Example | Cpd | R7 | R8 | Yield % | M.P. °C. |
|---------|-----|------|------|---------|----------|
| 27 | 27 | -CH$_3$ | -CH$_3$ | 94 (68) | 121-123 |
| 28* | 28* | -CH$_3$ | -CH$_3$ | 85 (58) | 212-217 |
| 29 | 29 | -C$_2$H$_5$ | -C$_2$H$_5$ | 75 (54) | 73-75 |
| 30 | 30 | -H | -CH(CH$_3$)$_2$ | 83 (60) | 122-125 |
| 31 | 31 | -H | -CH$_3$ | 45 (32) | 190-192 |

*hydrochloride of Compound 27.

The compounds of the present invention have pharmaceutical activity as anti-inflammatory agents, effective in the prevention and inhibition of granuloma tissue formation. The activity is demonstrated by a test which involves the diminution of experimental edema induced in the hind paw of the rat by the injection of carrageenin. This test is a standard procedure which is well known in the pharmaceutical art.

The procedure used for measuring the inhibition of carrageenin-induced edema is a modification of the method of Winter et al., Proc. Soc. Exptl. Biol. Med. 111: 544 (1962). The device used for measurement of the paw volume is an adaptation of the water displacement procedure described by Adamkiewicz et al., Can. J. Biochem. Physiol. 33: 332 (1955). The present compounds were studied for their effectiveness in preventing the edema caused by the intraplantar injection of 0.05 ml. of a sterile 1.0% solution of carrageenin. The present compounds were administered orally one hour prior to the injection of the carrageenin into the left hind paw of rats. At peak swelling time (3 hours) the volume of edema was calculated by differential paw volume.

We have found that many of the compounds produced significant inhibition of induced edema in rats at a dose rate of 200 mg/kg.

Table III lists the compounds of the formula (A) which exhibit reduction in edema in the hind paw of the rat.

TABLE III

% Reduction in Edema at 200 mg/kg
Compounds of Formula (A)

| Cpd. No. | % reduction of induced edema |
|----------|------------------------------|
| 1 | 41 |
| 2 | 54 |
| 3 | 33 |
| 4 | 37 |
| 5 | 38 |
| 6 | 30 |

TABLE III—Continued

% Reduction in Edema at 200 mg/kg
Compounds of Formula (A)

| Cpd. No. | % reduction of induced edema |
|----------|------------------------------|
| 7 | 41 |
| 8 | 30 |
| 9 | 48 |
| 10 | 54 |
| 11 | 38 |
| 12 | 62 |
| 13 | 38 |
| 14 | 52 |
| 15 | 40 |
| 16 | 38 |
| 17 | 51 |
| 18 | 40 |
| 19 | 40 |
| 20 | 31 |
| 21 | 47 |
| 22 | 23 |
| 23 | 28 |
| 24 | 21 |
| 25 | 20 |
| 26 | 35 |

Table IV lists the compounds of the formula (B) which exhibit reduction in edema in the hind paw of the rat.

TABLE IV

% Reduction in Edema at 200 mg/kg
Compounds of Formula (B)

| Cpd No. | % Reduction Edema at 200 mg/kg |
|---------|--------------------------------|
| 27 | 38 |
| 28* | 21 |
| 29 | 26 |
| 30 | 42 |
| 31 | 37 |

*hydrochloride of Compound 27

As can be readily seen from the foregoing Tables III and IV, all of the compounds of the present invention are effective in reducing induced edema by at least 20% in the rat at a dose of 200 mg/kg.

The compounds numbered 1, 3, 4, 8, 14–21 and 29 (see Tables II and IV) were selected for further study to determine the $ED_{50}$ in edema reduction. In this test, a group of normal rats was injected with carrageein to induce edema. Then the rats were treated with varying amounts of the above-described thirteen compounds, and the $ED_{50}$ was determined.

The procedure used for measuring the inhibition of carrageenin-induced edema is the above-described modification of the method of Winter et al., Proc. Soc. Exptl. Biol. Med. 111: 544 (1962). The device used for measurement of the paw volume is an adaptation of the water displacement procedure described by Adamkiewicz et al., Can. J. Biochem. Physiol. 33: 322 (1955). The above compounds were studied for their effectiveness in preventing the edema caused by the intraplantar injection of 0.05 ml. of a sterile 1.0% solution of carrageenin. Compounds were administered orally 1 hour prior to the injection of the carrageenin into the left hind paw of rats. At peak swelling time (3 hours) the volume of edema was calculated by differential paw volumes. The $ED_{50}$ value was obtained for each compound and is defined as that dose which reduced edema formation by 25% or more compared with the mean control response (parallel run) in 50% of the animals.

The results of this test are given in Table V.

TABLE V $ED_{50}$ vs. Carrageenin Assay

| Compound No. | Dose (mg/kg) | $ED_{50}$ mg/kg | Confidence Limits |
|---|---|---|---|
| 1 | 10, 30, 100, 300 | 42 | (19–92) |
| 3 | 10, 30, 100, 300 | 41 | (27–60) |
| 4 | 10, 30, 100, 300 | 150 | (71–315) |
| 8 | 10, 30, 100, 300 | 64 | (29–141) |
| 14 | 10, 30, 100, 300 | >200 | |
| 15 | 10, 30, 100, 300 | 69.5 | (51.1–91.5) |
| 16 | 10, 30, 100, 300 | >200 | |
| 17 | 10, 30, 100, 300 | 58 | (42.2–78.9) |
| 18 | 10, 30, 100, 300 | >200 | |
| 19 | 10, 30, 100, 300 | 30 | (15.8–57) |
| 20 | 10, 30, 100, 300 | >200 | |
| 21 | 10, 30, 100, 300 | 85 | (53.8–134.3) |
| 29 | 10, 50, 100, 200 | 78 | (41.4–122.6) |

Compounds 1, 3 and 8 were then studied to determine the $ED_{50}$ in adrenalectomized rats using the same range of doses as in the previous test.

The method used was identical to that described above, except that the animals used were adrenalectomized several days prior to assay. Since the results in the non-adrenalectomized animals were similar to those obtained in the adrenalectomized animals, it can be inferred that the anti-inflammatory activity of the test compounds was not caused by the release of endogenous andrenocortical steroids.

The results of this test are summarized in Table VI:

TABLE VI $ED_{50}$ vs. Carrageenin Assay in Adrenalectomized Rats

| Compound No. | Dose (mg/kg) | $ED_{50}$ mg/kg | Confidence Limits |
|---|---|---|---|
| 1 | 10, 30, 100, 300 | 26 | (13 – 51) |
| 3 | 10, 30, 100, 300 | 53 | (24 – 111) |
| 8 | 10, 30, 100, 300 | 46 | (17 –124) |

From Tables V and VI, it can be seen that Compound 1 has a lower $ED_{50}$ than all the other compounds in adrenalectomized rats as well as in normal rats.

The $LD_{50}$ of each of Compounds 1, 3 and 8 was determined and from the value of each, the therapeutic index was calculated. The therapeutic index is defined as the $LD_{50}$ divided by the $ED_{50}$ in the carrageenin assay. The results are given below in Table VII:

TABLE VII

THERAPEUTIC INDEX

| Compound No. | $LD_{50}$ (mg/kg) 48 hrs. and 5 days | $ED_{50}$ (mg/kg) | Therapeutic Index |
|---|---|---|---|
| 1 | 395 | 42 | 9.4 |
| 3 | 800 | 41 | 19 |
| 8 | >800 | 64 | 12.5 |

Table VIII gives the results of the test on Compounds 1 and 3, using varying doses to determine the $ED_{50}$ in local vs. systemic edema.

In the development of anti-inflammatory agents it is important to distinguish between irritants, which often demonstrate anti-inflammatory activity by a counter irritant type of effect, and true anti-inflammatory agents. The methods selected for demonstrating the true local anti-inflammatory effect of the present compounds was that developed by Shanahan, R.W., Arch. int. Pharmacodyn., 175: 186, 1969. This method utilizes the carrageenin-induced paw edema and the drug is injected locally simultaneously with the irritant substance, carrageenin, into the plantar surface of the hind paw of rats. Male rats weighing between 100 and 170 grams, fasted for 18 hours prior to use were employed in this study. The test compounds were added directly to the 1% carrageenin solution and injected in a volume of 0.5 ml. into the plantar tissue of the left hind paw. A group of control animals received carrageenin only. Three hours later the edema was measured. Anti-inflammatory or irritant effect was calculated as the percent increase or decrease in edema between the control groups and the treated groups. Ten rats were used per group. The calculated $ED_{50}$ was based on the number of animals in each group which showed an increase or decrease of at least 25% from the mean control values.

TABLE VIII

Local vs. Systemic Edema [$ED_{50}$ vs. Carrageenin]

| Compound No. | Dose (mg/paw) | $ED_{50}$ (Confidence Limits) | |
|---|---|---|---|
| 1 | 1, 2, 4, 8 | >8 mg/paw | |
| 3 | 1, 2, 4, 8 | 1.23 mg/paw | (0.89–1.68) |

In the cotton pellet granuloma test, Compound 1 has an $ED_{50}$ of 8 mg/kg. (Confidence Limit = 5.4 – 12.8.)

In this test, the inhibition of granuloma formation was determined by a modification of the method of Meier et al., Experientia 6: 469 (1950). Essentially, the test consists of subcutaneously implanting a sterile cotton disc into rats with the concomitant oral administration of the test compounds twice daily for 4 days. Removal of the pellets along with the granuloma formation after five days was performed and the increment in dry weight was considered as the measure of granuloma formation. Based on several studies, a 40% reduction in granuloma formation is considered significant.

Thus, a dose of 8 mg/kg is sufficient to cause a 40% reduction in granuloma formation in 50% of the test animals.

The adjuvant-induced arthritis test was also conducted in rats using Compound 1. This test requires one month (from 0 to day 31). In the first 17 days (0–17), the disease is in a developing stage, while for the remainder of the month (18–31) the disease is fully developed. The results of this test, given in terms of percent reduction of swelling in the hind paw of the rat are shown in Table IX.

The method is essentially that of Newbould, Brit. J. Pharmacol. 21: 127, 1963. The test compound was studied in the developing arthritic state and in the established arthritic state. Separate groups of 12 rats were administered the compound orally using methylcellulose as the vehicle. In the study on the developing disease, administration of the test compound begins on day 1 and on day 2 each animal is injected with 0.05 ml/kg of a 0.5% suspension of heat-killed *Mycobacterium tuberculosis* into the plantar surface of the left hind paw. Foot volumes were measured by a water displacement device on the day of administration of the Mycobacterium and again on days 3, 10 and 17. The test compound was administered once daily. Body weights were recorded daily and the animals were examined for the spread of the inflammation and the degree of secondary lesions observed and scored as "mild, moderate, or severe". For study in the established disease, another group of rats are injected with the Mycobacterium and foot volumes are measured and after 20 days are again measured and administration of the test compounds begin and continues for 11 days. Foot volume measurements are repeated on day 27 and day 31. The extent of the spread of the inflammation and the degree of lesions are recorded daily as are the body weights. The effect of the test compound is measured by the percentage reduction in left hind paw volumes as compared to the hind paw volumes of the control groups.

TABLE IX

ADJUVANT-INDUCED ARTHRITIS TEST IN RATS

% Reduction in Swelling — Hind Paw

| | DAY | COMPOUND 1 — 50 mg/kg |
|---|---|---|
| Developing Disease | 3 | 37 |
| | 10 | 13 |
| | 17 | 13 |
| Developed Disease | 20 | 5 |
| | 27 | 2 |
| | 31 | 0 |

The compounds of the present invention, either alone, or in the form of a pharmaceutical composition may be administered to an animal subject in any of a number of forms and via any of several routes. Thus, the compounds or compositions thereof may be orally adminstered in the form of tablets, pills, capsules, or in the form of a suspension. The compounds may also be administered parenterally in the form of an injectable solution or suspension. The compounds or compositions thereof may also be administered topically, in the form of an ointment or rectally, in the form of a suppository.

When orally administering the compounds or compositions, use can be made of a tablet, pill or capsule consisting entirely of the desired compound, although ordinarily, a composition comprising an effective amount of the compound and varying amounts of one or more physiologically inert materials such as carriers, vehicles, binders and the like will be used. Additionally, the compounds may be orally administered in the form of a suspension thereof in a suitable vehicle such as a syrup.

When parenterally administering the compounds or compositions, use may be made of a parenteral solution or suspension of the compound in a suitable solvent or suspension medium.

The compounds of the present invention may also be administered rectally in the form of a suppository comprising an effective amount of the desired compound and a suitable vehicle such as petroleum jelly.

Finally, the compounds of the present invention may be applied topically in the form of an ointment, salve, cream or lotion comprising an effective amount of the desired compound and a suitable vehicle such as petroleum jelly, etc.

The following examples are specific formulations of the compositions according to the invention.

EXAMPLE 32

Tablets may be prepared by the compression of a wet granulation containing the following:

| Ingredients | In each |
|---|---|
| Compound No. 1 | 30 mg |
| Polyvinylpyrrolidone | 6 mg |
| Lactose | 25 mg |
| Alcohol, 3A, 200 proof | 1 ml |
| Stearic Acid | 3 mg |
| Talc | 4 mg |
| Corn Starch | 15 mg |

Dosage: 1 Tablet 3 times a day.

EXAMPLE 33

A liquid suspension for oral administration may be prepared in the following formulation:

| Ingredients | In each 5 cc |
|---|---|
| Compound NO. 1 | 30 mg |
| Sodium carboxymethylcellulose | 5 mg |
| Syrup USP q.s. to | 5 cc |

Dosage: 1 teaspoonful (5 cc) every 3 to 4 hours.

EXAMPLE 34

Dry filled capsules (DFC) consisting of two sections of hard gelatin may be prepared from the following formulation:

| Ingredients | In each |
|---|---|
| Compound No. 1 | 30 mg |
| Lactose USP | q.s. |

Dosage: 1 capsule three times a day.

EXAMPLE 35

An ointment for topical use may be prepared using the following formulation:

| Ingredients | In each |
|---|---|
| Compound No. 1 | 5 gm |
| Hydrophilic petrolatum USP q.s. | 100 gm |
| Dosage: To be applied to inflamed skin areas as needed. | |

EXAMPLE 36

A parenteral suspension for intra-muscular administration may be prepared in the following formulation:

| Ingredients | |
|---|---|
| Compound No. 1 | 10 mg |
| Isotonic solution (0.85% saline) | 5 cc |
| Surfactant (a 1% solution of polysorbate 80 USP) | 1 cc |

Variations and modifications can, of course, be made without departing from the spirit and scope of the invention.

Having thus described our invention, what we desire to claim and protect by Letters patent is:

1. A compound of the formula:

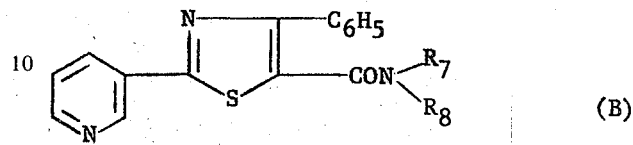

wherein $R_7$ is hydrogen or an alkyl group of up to three carbon atoms and $R_8$ is an alkyl group of up to three carbon atoms; and pharmaceutically acceptable acid addition salts thereof.

2. A compound as claimed in claim 1, wherein $R_7$ and $R_8$ are both $-C_2H_5$.

3. A compound as claimed in claim 1, wherein $R_7$ is hydrogen and $R_8$ is $-CH(CH_3)_2$.

4. A compound as claimed in claim 1, wherein $R_7$ and $R_8$ are both $-CH_3$ and the hydrochloride thereof.

* * * * *